United States Patent [19]

Hardman

[11] Patent Number: 4,955,762
[45] Date of Patent: Sep. 11, 1990

[54] PLENUM FAN ASSEMBLY

[75] Inventor: Allen D. Hardman, Hollister, Calif.

[73] Assignee: Raymond Production Systems Corporation, Hollister, Calif.

[21] Appl. No.: 380,686

[22] Filed: Jun. 14, 1989

Related U.S. Application Data

[63] Continuation-in-part of Ser. No. 256,059, Oct. 11, 1988, abandoned.

[51] Int. Cl.$^5$ .............................................. B65G 51/02
[52] U.S. Cl. ..................................................... 406/88
[58] Field of Search ...................... 226/97; 406/86, 87, 406/88; 417/362

[56] References Cited

U.S. PATENT DOCUMENTS

| 2,100,439 | 11/1937 | Friedman | 417/362 |
| 2,735,611 | 2/1956 | McLean | 417/362 |
| 2,790,596 | 4/1957 | Stirling | 417/362 |
| 3,101,890 | 8/1963 | Carlson | 417/362 |
| 3,584,968 | 6/1971 | Keith | 417/362 |
| 3,650,633 | 11/1970 | Benoit | 417/362 |
| 4,392,760 | 7/1983 | Futer . | |

Primary Examiner—Sherman D. Basinger
Assistant Examiner—Stephan P. Avila
Attorney, Agent, or Firm—Limbach, Limbach & Sutton

[57] ABSTRACT

An air conveyor assembly whereby objects are transported on the top deck of an elongated plenum. The plenum is pressurized by a high-performance wheel fan member contained entirely within the plenum driven by a motor contained entirely within a filter housing located on the bottom wall of the elongated plenum.

3 Claims, 1 Drawing Sheet

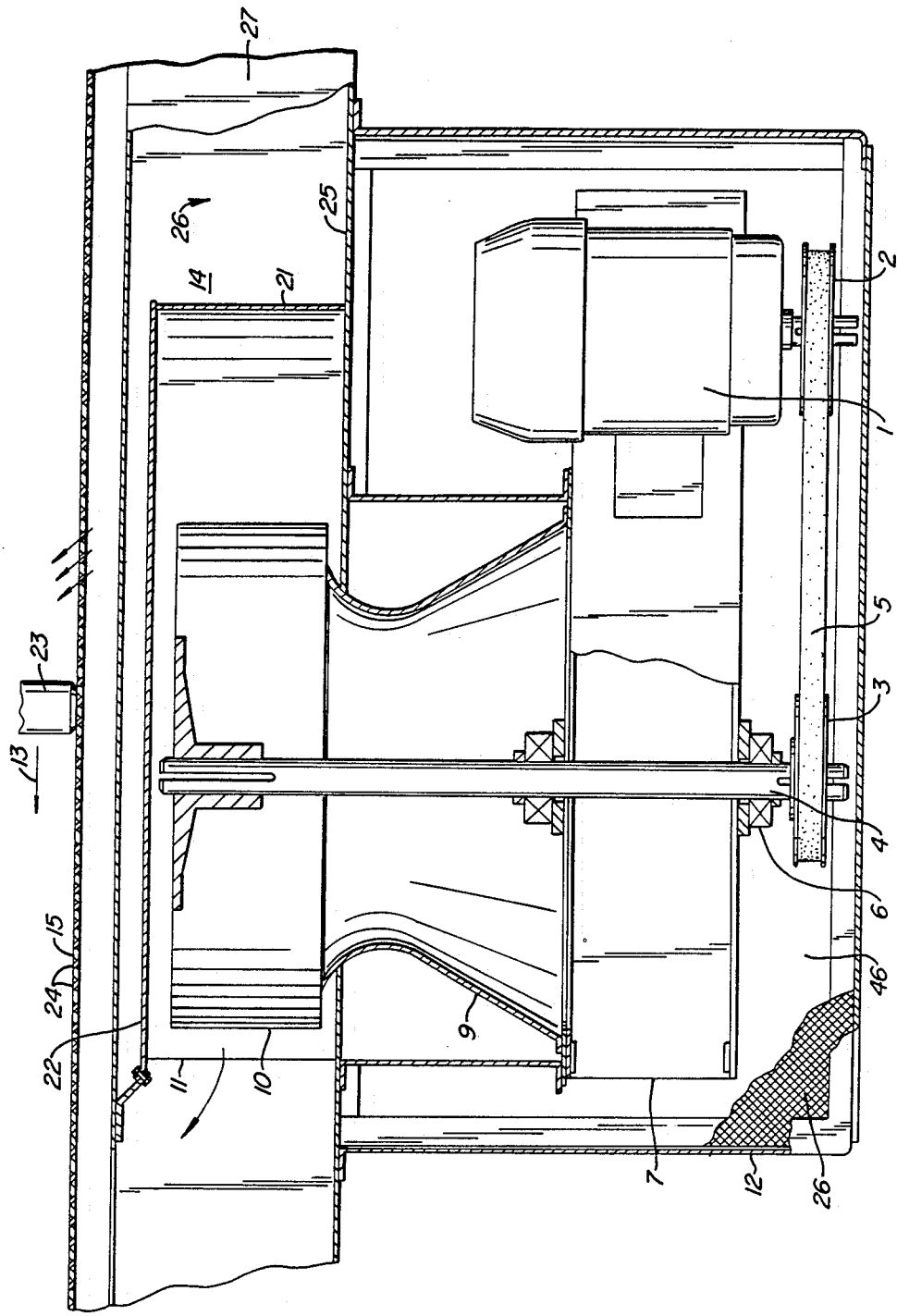

PLENUM FAN ASSEMBLY

This is a continuation-in-part of co-pending application Ser. No. 071256.059 filed on Oct. 11, 1988, now abandoned.

TECHNICAL FIELD OF INVENTION

The present invention deals with an air conveyor assembly in the form of an elongated plenum. The plenum is provided with a top deck surface having slit openings therein for the directional discharge of air employed for the movement of objects along the air conveyor. Placement of the wheel fan member and its supporting structure employed for pressurizing the interior of the plenum provides for a more efficient usable assembly than comparable systems of the prior art.

BACKGROUND OF THE INVENTION

It is exceedingly well known to employ an elongated plenum having side walls, a bottom wall and a top deck surface for use in conveying objects such as cans. Characteristically, the top deck surface is provided with an array of slit openings for the directional discharge of air from the interior of the elongated plenum. Objects placed upon the top deck surface are caused to move over said surface in response to pressurization of the plenum and resulting discharge of air through the array of slit openings.

Pressurization of various plenum assemblies has been carried out through the use of scroll housings placed about wheel fans. These housings are generally placed at an extremity of the plenum or air conveyor segment causing air to be drawn from the ambient surroundings and directionally injected within the elongated plenum structure from the scroll housing itself or from a transition duct.

It has recently been suggested in U.S. Pat. No. 4,392,760, which was issued on July 12, 1983, the disclosure of which is incorporated by reference herein, that the scroll housing be eliminated and that an open wheel fan be mounted directly within the plenum of a surface flow air conveyor. It was recognized by this patented reference that although scroll housings were conventionally taught to be employed to obtain maximum outlet pressure, by placing an open wheel fan within the plenum itself, increased performance could be achieved.

Although the teachings of U.S. Pat. No. 4,392,760 represented an advance in the art, implementation o this invention was not without its shortcomings. More specifically, the open wheel fan assemblies were taught to be employed within a side wall of the plenum or in a pod structure beneath the plenum whereby a horizontally aligned shaft was employed connecting an electric motor to the fan wheel. Such a configuration resulted in a motor assembly and filter housing protruding on one or both sides of the plenum structure which would limit the user in placement of the plenum proximate a solid wall or a parallel air conveyor assembly. One could not walk parallel to the air conveyor without tripping or maximize assembly nesting through the use of parallel lines. In addition, it was found that in placing the wheel fan assembly on a horizontally extending shaft through the side wall of the plenum as taught in U.S. Pat. No. 4,392,760, efficiency, as measured by pressure output for a specific motor was not optimized.

It is thus an object of the present invention to provide an air conveyor while eliminating the shortcomings of the prior art.

It is thus a further object of the present invention to provide an air conveyor assembly wherein a high performance wheel fan member is placed directly within the air conveyor plenum while eliminating the shortcomings inherent in the design disclosed and claimed in U.S. Pat. No. 4,392,760.

These and further objects will be more readily apparent when considering the following invention and appended drawings wherein;

the sole appended figure represents a side elevational view of a structure representing the present invention.

SUMMARY OF THE INVENTION

The present invention deals with an air conveyor assembly comprising an elongated plenum having side walls, a bottom wall and a top deck surface. The top deck surface is characterized as possessing an array of slit openings for the directional discharge of air from the interior of the elongated plenum for the movement of objects along the top deck surface.

The improvement offered by the present invention deals with a structure for providing pressurized air within the elongated plenum. In this regard, a high performance wheel fan member for pressurizing the plenum is located entirely within the plenum member. A substantially circular air-supply inlet is located below the wheel fan member passing through the plenum bottom wall. A substantially vertical shaft for supporting the wheel fan member is caused to extend through the air-supply inlet and functionally engage a motor designed to rotate the vertical shaft and, in turn, the wheel fan.

A filter housing is appended to the plenum bottom wall. It is characterized as having one or more open side walls having positioned therein filter members through which air is drawn to the interior of the elongated plenum by the wheel fan member. The housing is further characterized as completely enclosing the motor, vertical shaft and air-supply inlet.

DETAILED DESCRIPTION OF THE INVENTION

As previously noted, the present invention comprises an air conveyor assembly consisting of elongated plenum 14 having side walls 26 and 27, top deck surface 15 and a bottom wall 25. This elongated plenum, having a substantially square or rectangular cross section is provided with an array of slit openings 24 for the directional discharge of air from the interior of elongated plenum 14 causing, for example, the movement of can 23 in the direction of arrow 13 along top deck surface 15. The use of what has come to be known as Coanda-effect directional slit orifices are described in numerous pieces of prior art, such as U.S. Pat. No. 3,980,024, issued on Sept. 14, 1976, the disclosure of which is hereby incorporated by reference.

Obviously, for devices of this type to operate, means must be provided for pressurizing the elongated plenum. This consists of high performance wheel fan member 10. Wheel fans of this type are manufactured by, for example, Chicago Blower Corporation and by New York Blower Co. and are, again, well known to those skilled in this art.

Fan wheel 10 draws air from the ambient surroundings through substantially circular air-supply inlet 9. Most advantageously, air inlet 9 is of a conical shape noting that fan wheel 10 draws air through inlet 9 and changes its direction 90° in pressurizing the interior of plenum 14. It is contemplated, in practicing the present invention, that air-supply inlet 9 extend through plenum bottom wall 25. In doing so, shaft 4 can extend vertically from the interior of the plenum where it supports high performance wheel fan member 10 at its most vertical extremity. Vertical shaft 4 is supported by motor mount 7 and is provided for free rotation by employing flange-mounted ball bearings 6.

Also located upon motor mount 7 is electric motor 1 which is employed for turning vertical shaft 4 and, in turn, wheel fan 10. Ideally, substantially vertical shaft 4 is provided with pulley wheel 3 on its end remote from that supporting wheel fan member 10. A second pulley wheel is mounted on motor 1 and the first and second pulleys are functionally connected by drive belt 5. This drive belt system enables fan wheel 10 to be driven at a particular speed depending upon air requirements. One need only change the pulley ratio to change wheel fan speed. As such, a single motor can be employed for various pressurization requirements noting that only the pulley ratios need be changed as desired.

In practicing the present invention, it is contemplated that filter housing 12 be employed having one or more open side walls 46 having positioned therein filter members 26, shown in the appended figure in cut-away to facilitate illustration of internal components. It is contemplated that all air drawn through substantially circular air-supply inlet 9 pass through filter members 26 and that the entire housing be located beneath and appended to plenum bottom wall 25. As illustrated, filter housing 12 completely encloses motor 1, vertical shaft 4 and air-supply inlet 9, as well as those supporting elements necessary in providing structural support to such an assembly.

It is further contemplated that, as a preferred expedient, wheel fan housing 11 be located within elongated plenum 14 to at least partially surround wheel fan 10 and shield top deck surface 15 from any direct output emanating from said wheel fan by virtue of fan wheel housing top member 22. The fan wheel housing can be one of two configurations. Curved rear wall 21 can be provided so that the air discharged from wheel fan 10 is directed within plenum 14 in a single upstream direction to serve as a dam between various zones supplied by neighboring wheel fan assemblies. In addition, the fan wheel housing can be open in both upstream and downstream directions so that the only shielding created is with respect to top deck surface 15.

The configuration described above offers a number of advantages over prior art installations, including those described and claimed in U.S. Pat. No. 4,392,760. This invention facilitates virtually complete fabrication prior to installation at the job site, thus reducing installation costs. Less volume is required in shipping, again resulting in a cost-saving expedient. It is noted that air conveyor lines can be run parallel to one another and quite close together, thus occupying less space in the factory and reducing installation labor, for the motor and filter housing are located beneath the elongated plenum. As such, catwalks can be run parallel and close to any air conveyor which results in space saving at the factory while improving access to the air conveyor assembly in conducting service and routine maintenance.

By providing a filter housing which completely surrounds the drive system of the wheel fan member, numerous benefits are realized. The filter housing serves the function of not only supporting filter elements 26 but also serves to guard the rotating parts of the drive system from inadvertent abuse. It is believed that the electric motor life will be extended because of its mounting within the filter housing in the path of high velocity air drawn through air-supply inlet 9 by wheel fan member 10. By removing the filters, there is complete access to all of the internal mechanical components of the blower, including the timing belt drive, motor adjustment apparatus, bearings and virtually all other component parts employed to mount and align the fan.

Being belt driven, the wheel fan assembly of the present invention can be adjusted within the velocity range of the impeller and the horsepower range of the motor to achieve optimum performance. And, as previously noted, by placing the wheel fan assembly on a vertically extending shaft as shown in the appended figure, efficient is enhanced for a given motor as measured by pressure achieved within the plenum when compared to various prior devices including the competing device taught by U.S. Pat. No. 4,392,760.

I claim:

1. An air conveyor assembly comprising an elongated plenum having side walls, a bottom wall and a top deck surface, said top deck surface being characterized as possessing an array of slit openings for the directional discharge of air from the interior of said elongated plenum for the movement of objects along said top deck surface, the improvement comprising providing means for pressurizing the elongated plenum comprising:
   a. a high performance wheel fan member for pressurizing said plenum which is entirely enclosed within said plenum member;
   b. a substantially circular air-supply inlet located below said wheel fan member and through said plenum bottom wall;
   c. a substantially vertical shaft for supporting said wheel fan member and extending through said air-supply inlet;
   d. a motor for turning said vertical shaft and, in turn, said wheel fan; and
   e. a filter housing appended to said plenum bottom wall being characterized as having one or more open side walls having positioned therein filter members through which air is drawn to the interior of said elongated plenum by said wheel fan member and said housing being further characterized as completely enclosing said motor, vertical shaft and air-supply inlet.

2. The air conveyor assembly of claim 1 wherein a first pulley wheel is positioned on said vertical shaft and a second pulley wheel mounted on said motor, said first and second pulleys being functionally connected by a drive belt.

3. The air conveyor assembly of claim 1 wherein a wheel fan housing is located within said elongated plenum to at least partially surround said wheel fan and shield said top deck surface from any direct output emanating from said wheel fan.

* * * * *

UNITED STATES PATENT AND TRADEMARK OFFICE
CERTIFICATE OF CORRECTION

PATENT NO. : 4,955,762

DATED : September 11, 1990

INVENTOR(S): Allen D. Hardman

It is certified that error appears in the above - identified patent and that said Letters Patent is hereby corrected as shown below:

On the cover page of the patent, in the left hand column, please change the assignee from "Raymond Production Systems Corporation, Hollister, Calif." to --The Stolle Corporation--.

On the cover page of the patent, in the left hand column, please change the date filed from "Jun. 14, 1989" to --July 14, 1989--.

In column 1, line 4, change "071256.059" to read --07/256,059--.

In column 1, line 48, change "o" to --of--.

In column 4, lines 21-22, change "efficient" to --efficiency--.

Signed and Sealed this

Eighteenth Day of June, 1991

Attest:

HARRY F. MANBECK, JR.

*Attesting Officer*

*Commissioner of Patents and Trademarks*